PRESSURE GAUGE TESTING SYSTEM
Filed Oct. 15, 1968 5 Sheets-Sheet 1
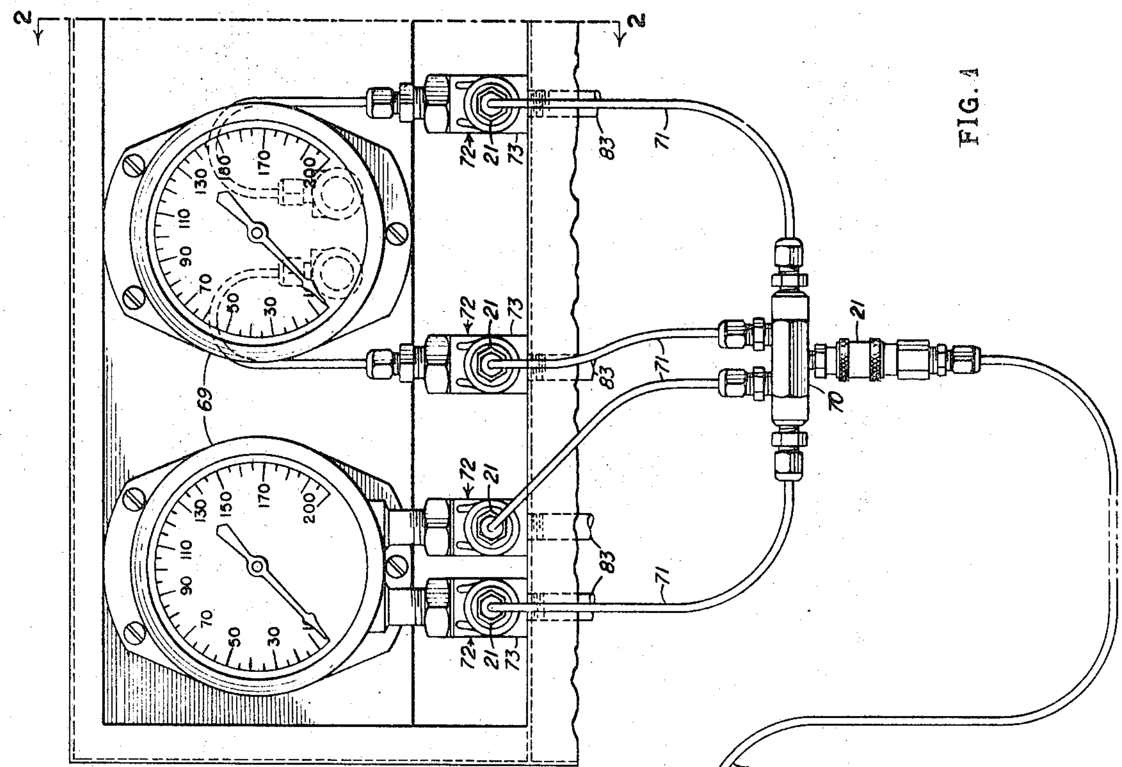
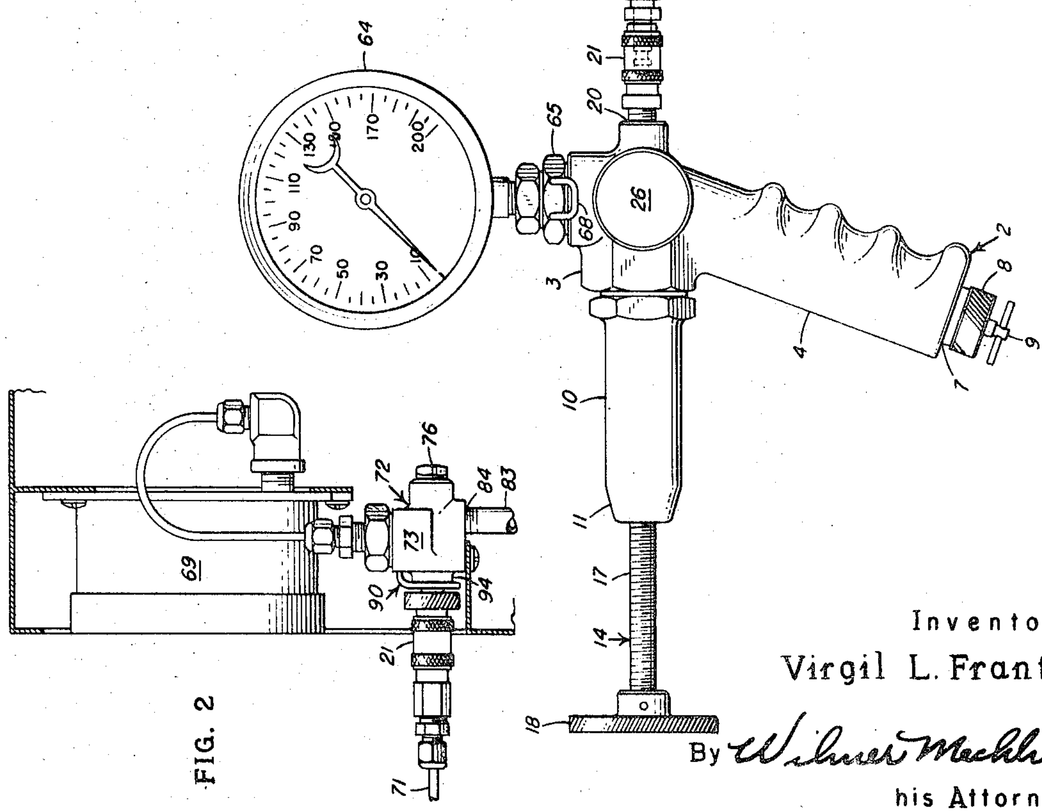
Inventor:
Virgil L. Frantz
By Wilmer Mechlin
his Attorney PRESSURE GAUGE TESTING SYSTEM
Filed Oct. 15, 1968 5 Sheets-Sheet 2
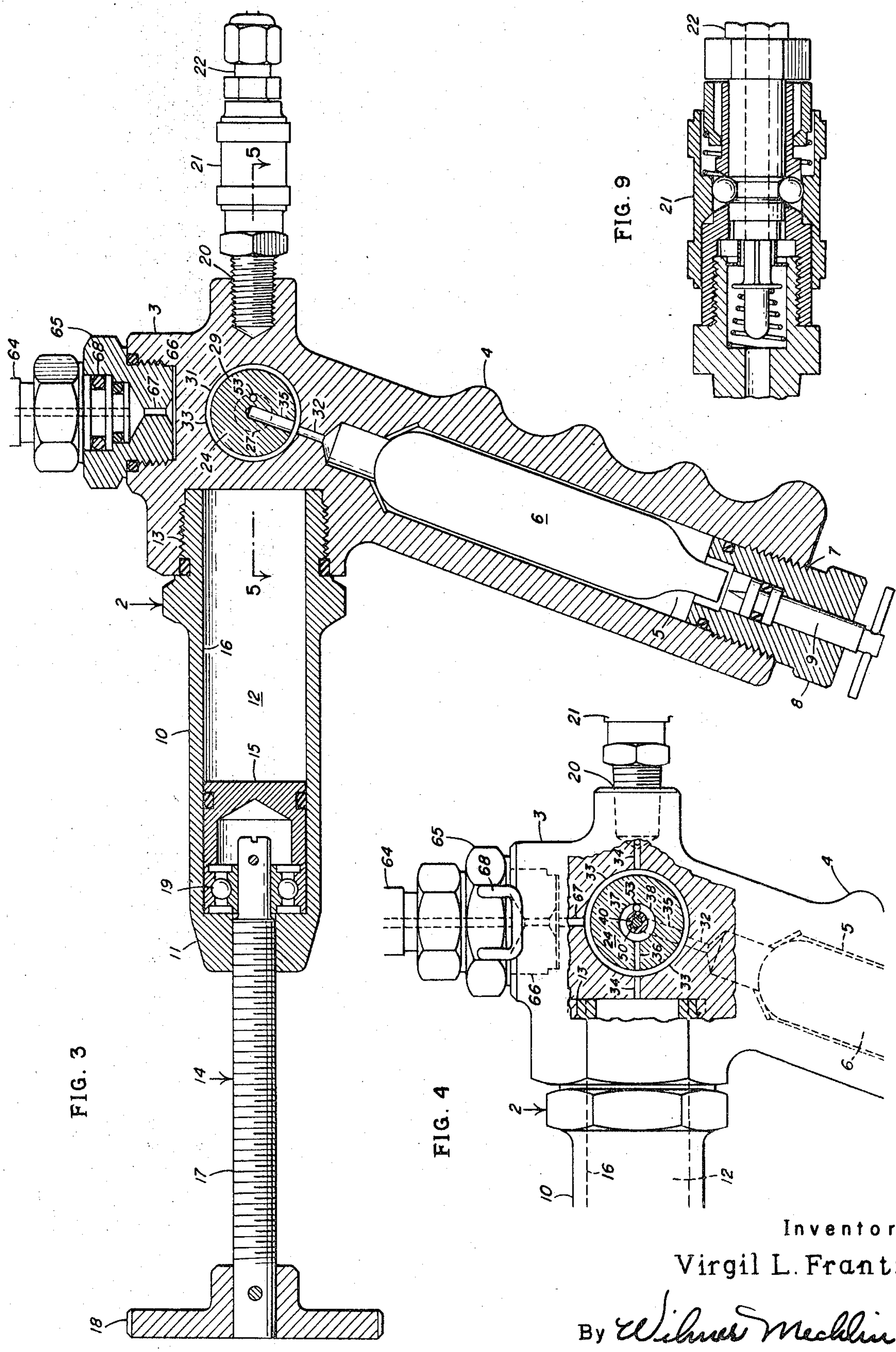
Inventor:
Virgil L. Frantz
By Wilmer Mechlin
his Attorney

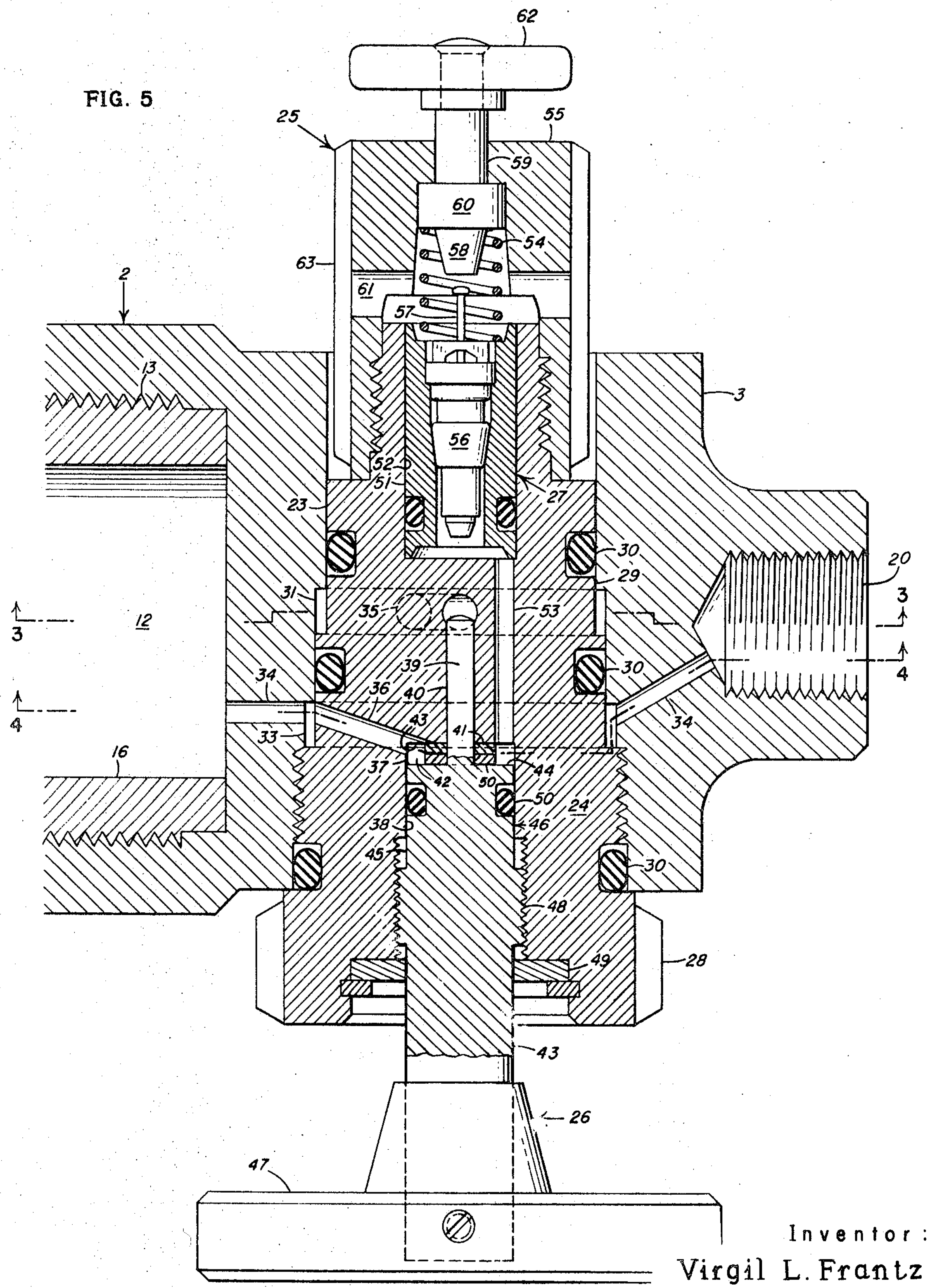
Inventor:
Virgil L. Frantz
By Wilmer Mechlin
his Attorney

Jan. 26, 1971 V. L. FRANTZ 3,557,602
PRESSURE GAUGE TESTING SYSTEM
Filed Oct. 15, 1968 5 Sheets-Sheet 4
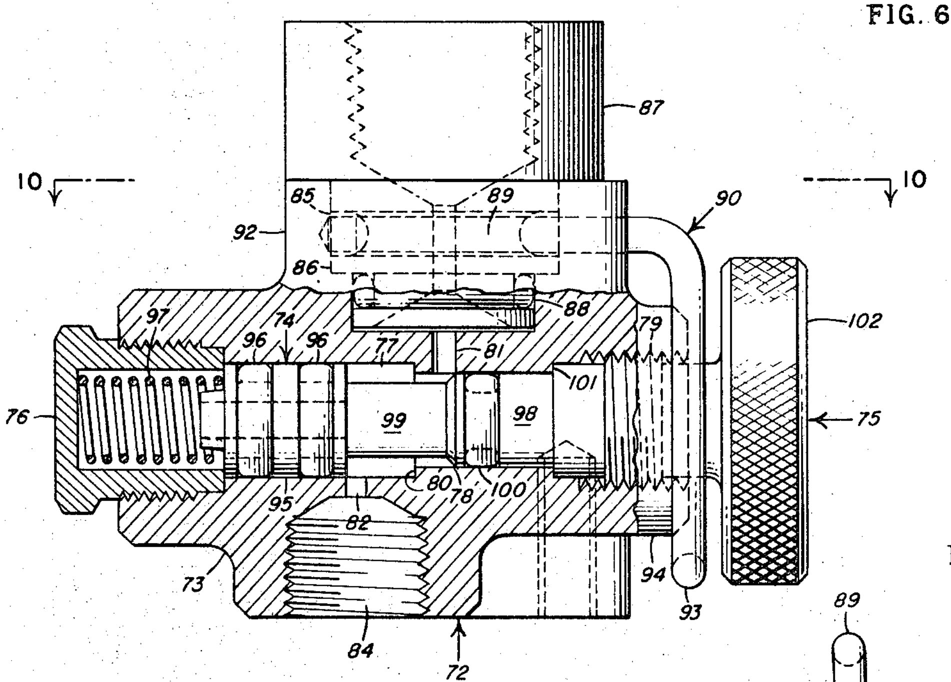
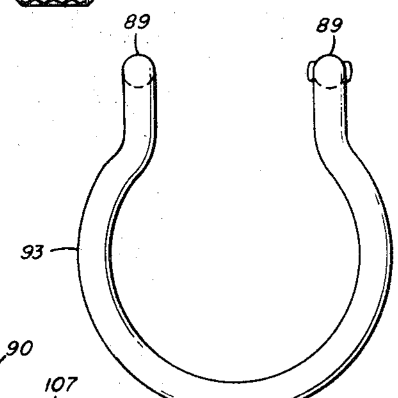
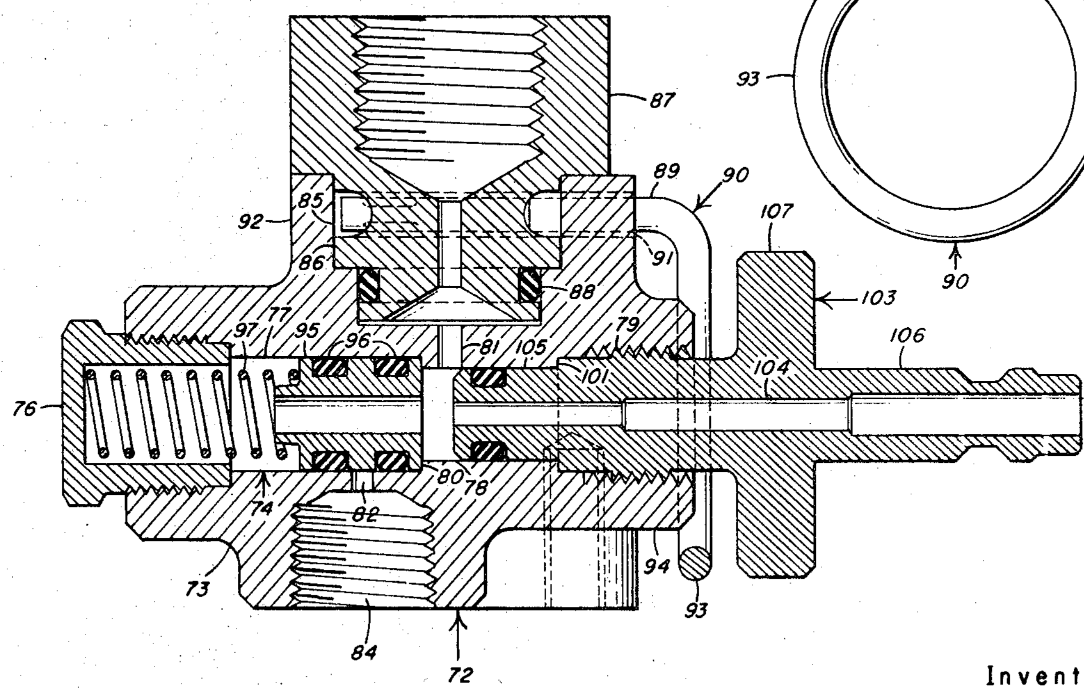
FIG. 8
Inventor:
Virgil L. Frantz
By Wilmer Mechlin
his Attorney PRESSURE GAUGE TESTING SYSTEM
Filed Oct. 15, 1968 5 Sheets-Sheet 5
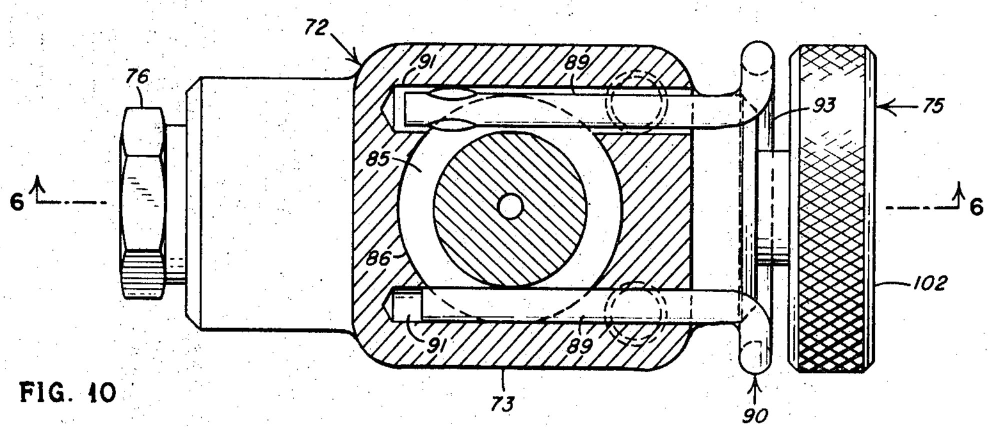
FIG. 10
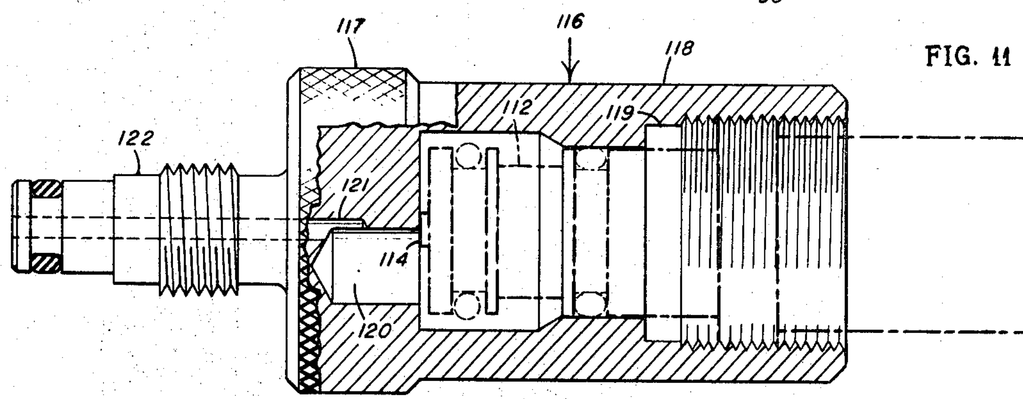
FIG. 11
FIG. 12
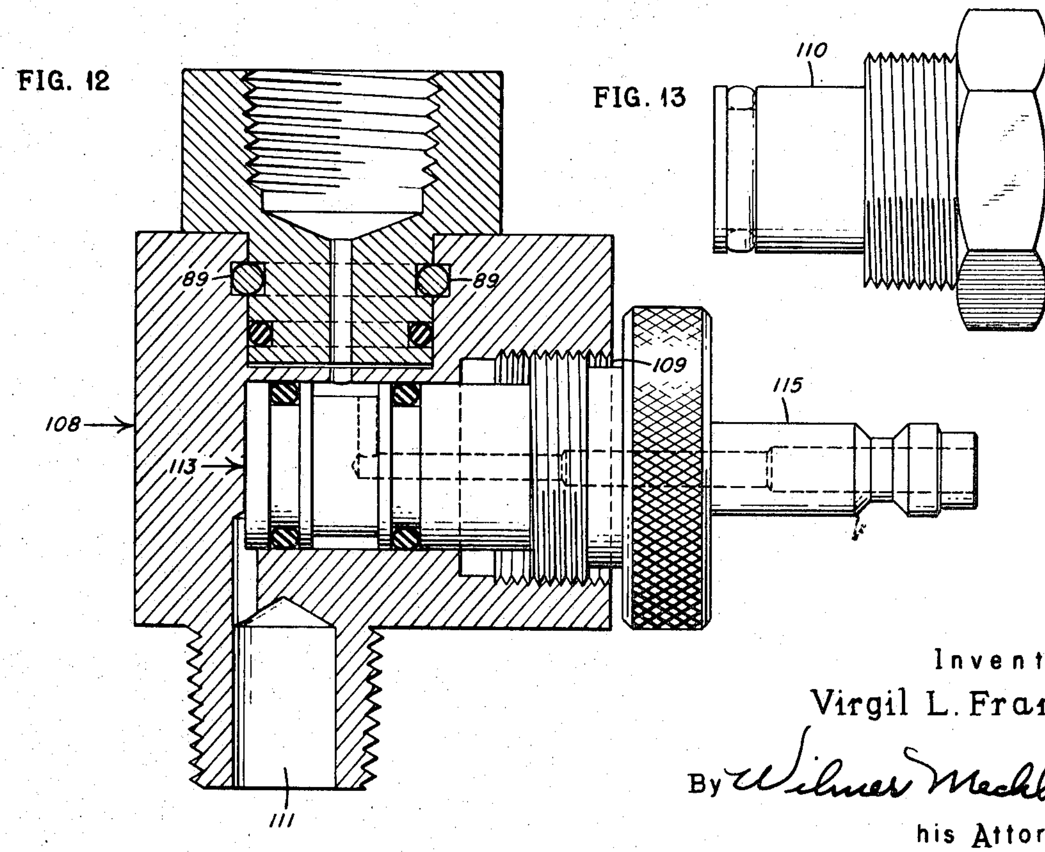
FIG. 13
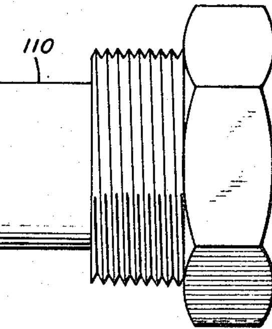
Inventor:
Virgil L. Frantz
By Wilmer Mechlin
his Attorney United States Patent Office 3,557,602

Patented Jan. 26, 1971

3,557,602

PRESSURE GAUGE TESTING SYSTEM

Virgil L. Frantz, Salem, Va., assignor to Graham-White Sales Corporation, Salem, Va., a corporation of Virginia Filed Oct. 15, 1968, Ser. No. 767,631
Int. Cl. G01l 27/00
U.S. Cl. 73—4 18 Claims

ABSTRACT OF THE DISCLOSURE

A pressure gauge is calibrated by using a hand-holdable testing gun with a fitting for mounting the pressure gauge. A pressure line leads from the testing gun to the gauge. The fitting locks the gauge in place during testing and prevents unlocking of the gauge except on removal of a plug which normally closes the fitting's testing port. The gun carries a gas charge and the maximum pressure of the gas charge is varied over the test range of the gauge. A master gauge is mounted on the gun to compare the test pressure with the gauge being tested.

BACKGROUND OF THE INVENTION

Diesel locomotives in particular are equipped with numerous air pressure gauges which must be tested periodically for accuracy. Conventionally, such gauges are tested by testing systems using oil as the testing fluid, applying pressure to the oil by a hand-wheel operated screw piston, which, with its cylinder is of such weight as to require mounting during testing, and transmitting the applied pressure to the gauge through a fitting which is ported to receive a testing probe but does not automatically cut off the pressure line to which the gauge is normally connected during application and removal of the probe. It is to an improved system for testing such gauges that the present invention is particularly directed.

SUMMARY OF THE INVENTION

The primary object of the present invention is to provide an improved system for testing fluid pressure sensing members, such as pressure gauges, using as its testing medium a compatible fluid and, for applying that medium to the gauge over the latter's pressure range, a testing gun mounting a master gauge and holdable in one hand, while presenting for manipulation by the other means for regulating the applied pressure, and obtaining the medium under pressure from a pressurized cartridge fittable in the gun.

Another object of the invention is to provide an improved gauge testing system in which the gauge to be tested is releasably locked to a fitting permanently connectable to a pressure line and that line is automatically shut off on and unlocking of the gauge is prevented except on removal of a plug normally closing the fitting's testing port.

Features of the improved system include the provision in the testing gun of a reservoir removably seating a $CO_2$ or like pressurized gas cartridge, a piston screwed into a cylinder for varying the applied pressure over the range of the gauge and a valve member for reducing to a suitable level the pressure of the testing medium transmitted from the reservoir to the cylinder and compensating for any leakage in the system, manifolding and quick-disconnect couplings for enabling one or more gauges having similar ranges to be tested simultaneously and adapters for enabling the system to test a gauge mounted in a conventional fitting, as well as to enable its fitting to be used in testing a gauge with the conventional system.

Other objects and features of the invention will appear hereinafter in the detailed description, be particularly pointed out in the appended claims and be illustrated in the accompanying drawings, in which:

FIG. 1 is an elevational view showing a side of the testing gun and fronts of the gauges in a typical test hook-up of the improved testing system of the present invention;

FIG. 2 is a fragmentary vertical sectional view taken along the lines 2—2 of FIG. 1;

FIG. 3 is a fragmentary vertical sectional view on an enlarged scale of the testing gun of FIG. 1, taken along lines 3—3 of FIG. 5;

FIG. 4 is a fragmentary vertical sectional view on the scale of FIG. 3, taken along lines 4—4 of FIG. 5;

FIG. 5 is a fragmentary vertical sectional view on a further enlarged scale taken along lines 5—5 of FIG. 3;

FIG. 6 is a view on the scale of FIG. 5 of the preferred gauge fitting of the improved system, partly in side elevation and partly in a vertical section taken along the lines 6—6 of FIG. 10, showing the normal condition of the fitting;

FIG. 7 is a plan view of the locking key of the fitting of FIG. 6;

FIG. 8 is a view of the fitting of FIG. 6 in the vertical section of part of that figure, showing the fitting in testing condition;

FIG. 9 is a central longitudinal sectional view on a reduced scale relative to FIG. 5, showing, as connecting the bayonet of FIG. 8 to the line from the testing gun, a form of quick disconnect coupling suitable for use in the improved system;

FIG. 10 is a horizontal sectional view taken along lines 10—10 of FIG. 6;

FIG. 11 is a side elevational view partly in central section of an adapter enabling a gauge equipped with the preferred fitting to be tested with the conventional system;

FIG. 12 is a central vertical sectional view of a conventional gauge fitting showing applied thereto an adapter for enabling a gauge mounted thereon to be tested with the improved system; and FIG. 13 is a side elevational view of the plug normally closing the testing port of the conventional fitting of FIG. 12.

DETAILED DESCRIPTION

Referring now in detail to the drawings in which like reference characters designate like parts, the improved testing system of the present invention is adapted for testing fluid pressure sensing member, such as pressure gauges and switches, of which the air pressure gauges found on diesel locomotives have been illustrated as exemplary of the invention.

Designated as 1, the improved testing system is comprised of a testing gun or tester 2 having a body 3, rigid or integral with and downstanding obliquely from which is preferably a pistol grip handle 4. In the handle is a longitudinally or axially extending reservoir or storage chamber 5 for removably receiving or seating a $CO_2$ or like pressurized gas cartridge or capsule 6, for insertion of which the chamber has a bottom opening 7 normally cloosed by a gasketed plug 8 axially mounting a piercing pin 9 for piercing the adjoining end of the cartridge to release or discharge the gas into the reservoir. A longitudinally disposed barrel or cylinder 10 having a rear wall 11 closing at the rear a forwardly opening axial chamber or bore 12, is sealingly threaded or screwed into a rearwardly opening socket 13 in and projects or extends rearwardly from the body 3. For finely or precisely varying or regulating the free volume of its chamber 12 and thus the pressure therein, the barrel mounts an axially or longitudinally reciprocable or shiftable piston 14 having in the barrel a head 15 slidably and sealing engaging the side wall or side 16 of the chamber and a rearwardly extending stem 17 threaded through the rear wall 11 and carrying at the rear a knurled operating knob 18, the head and stem preferably being drivable connected by a ball or other suitable antifriction bearing 19 so as to enable the stem to be turned for advancing and retracting the head without requiring turning of the latter.

In the front of the body 3 is an outlet port 20 into which is threaded one of the plurality of self-closing, quick-disconnect couplings 21 used in the system, each suitably of the type shown in detail in FIG. 9, the particular coupling serving to connect the gun 2 to a desirably flexible plastic outlet pipe or tube 22.

Extending laterally through the body 3 of the gun 2, between and spaced from the reservoir 5 and piston chamber 12 and the outlet port 20, is a cross bore 23 which suitably is cylindrical and progressively reduced or downstepped from one end to the other. In this cross bore is threaded or otherwise releasably seated or received an in part correspondingly reduced casing or body 24 of a valve assembly 25. Preferably of the cartridge type for application and removal as a unit, the valve assembly 25 includes a control or metering valve 26 and a pressure relief valve 27, which cooperate or coact to determine or control the pressure level at which the gas at high pressure in the reservoir 5 in the handle 4 is made available as working or testing pressure for regulation by the piston 14.

Insertable into the cross bore 23 from its larger end, the casing 24 has at its corresponding end a head 28 wider than the bore for engaging the adjoining side of the body 3 to fix or locate the axial position or disposition of the inserted valve assembly 25 relative to the body 3 and also is of hex or other suitable configuration for application of a wrench or other suitable turning tool (not shown) for threading or screwing the casing into the body. When the casing 24 is inserted in the cross bore 23, the joint 29 between the casing and the body 3 about the bore is suitably sealed at critical points, as by a plurality of axially spaced O-rings 30 carried by and peripherally seated in the casing, and the joint is interrupted by a pair of axially spaced annular channels or grooves, each bracketed and sealed from the other by certain of the O-rings. Of the annular channels, one, 31, for high pressure or reservoir air is relatively remote from the casing head 28 and connected by a duct or passage 32 in the body to the inner end of the reservoir 5 in the handle 4. The other annular channel 33 is for low or testing or working pressure and connected by a pair of oppositely extending passages 34 to the adjoining ends of the testing pressure or piston chamber 12 in the barrel 10 and the outlet port 20. Within the casing 24, the channels 31 and 33 connect respectively to a high pressure chamber 35 oblique to and leading inwardly to the center of the casing and a generally radially extending passage 36 leading inwardly to a cylindrical valve chamber 37 concentric or coaxial with the casing and spaced axially from the high pressure chamber 35 and forming the inner or inboard end portion of an axial socket or cavity 38 in the casing which extends outwardly or outboardly to and opens outwardly onto the outer end of the head 28.

For reducing the high pressure available in the reservoir 5 to the working or testing pressure introduced into or made available to the piston chamber 12 in the barrel 10, the preferred control valve 26 has for connecting high pressure chamber 35 and valve member 37 an axial valve seat or passage 39 of extended length and a pin 40 received or seating and shiftable axially in and conveniently extending substantially the length of the seat. While the control valve 26 may be a needle valve dependent for closing upon a tapered fit between the pin 40 and the seat 39, the natural tendency of an operator to apply more force than necessary in closing the control valve in time would produce excessive wear by the swaging or galling action of the pin. To prevent this, in the preferred control valve 26, both the seat 39 and the pin 40 are cylindrical with only a slight or fine clearance therebetween so as to choke or throttle flow of fluid between the chambers 35 and 37 and opening and closing of the seat for such flow devolves upon one and preferably a pair of nylon or like high compressive strength, lubricious washers 41 seated in the valve chamber and together serving as a valve element axially bored and slidably fitting on and laterally or radially centered by the pin 40, the preferred washers 41 desirably are of less diameter than the valve chamber 37 so as to leave open therein an annular peripheral space 42 opening onto connecting passages. Contained axially between the inner wall 43 of the chamber 37 and the inner end 44 of the stem 45 of the control valves' valve member 46, of which the pin 40 preferably is an integral inward extension, the washers, on outward movement of the stem, are moved or pushed away from the inner wall by the high pressure from the chamber 35 and open the pressure chamber for flow of fluid therethrough and with a minimum of wear to themselves and the surfaces engages thereby due to their lubricity.

Projecting outwardly beyond the casing 24 and there carrying a suitably knurled operating handle or knob 47, the stem 45 fits or is received in the socket 38 and has a relatively enlarged externally threaded collar portion 48 intermediate its ends threadedly engaging an adjoining portion of the socket so as to be axially movable relative thereto when turned. Inwardly of the collar portion 48, the stem is smooth for sliding engagement with the unthreaded inner portion of the cavity and terminates in the preferably flat inner end 44 bounding or defining the outer side of the valve member 46. Limited in inward movement by the washers 41 and by its axial movement relative to the casing determining the extent of opening of the seat, the stem 45 is limited in its outward movement for correspondingly limiting the maximum opening of the seat, conveniently by a snap-ring retained stop washer 49 fitted about the stem in the outer portion of the socket 38 and engageable with the outer end of the stem's collar portion 48. Leakage from that chamber about the stem is prevented by an O-ring or like gasket 50 conveniently carried by the stem.

The pressure relief valve 27 included in the preferred valve assembly 25 in addition to the control valve 25, desirably is a combined automatic and manual operation, the preferred relief valve is of the piston type with an annular or sleeve piston 51 slidable in and laterally sealingly engaging a cylindrical socket or cavity 52 opening onto the inner or smaller end of the casing 24 beyond the adjoining or corresponding side of the body 3 and axially spaced from the central high pressure chamber 35 and on a side thereof opposite or beyond the control valve socket 38. A branch passage or duct 53 in the casing 24, by-passing the central chamber 35, connects the valve chamber 37 at the inner end of the socket 38 to the adjoining end of the socket 52 for applying pressure to the inner end of the piston 51 and a spring 54 acting between the outer end of the piston and a hex or like cap 55 screwed onto the smaller end of the casing and releasing or compressing at about 200 p.s.i. or other predetermined pressure, normally holds the piston against the inner end of its socket.

A check valve, conveniently in the form of a tire-type valve core 56, is threaded into the outer end of the annular piston 51 and for tripping or opening presents its stem 57 to the normally spaced inner end 58 of the concentric actuator 59 extending through and slidable or shiftable axially in the adjoining end of the cap 55. An enlarged collar 60 on the actuator 59 outwardly of its inner end 58 and normally backed by the cap, engages the outer end of the relief spring 54 and a bleed or exhaust port 61 extends radially through the cap outwardly of the adjoining end of the casing 24. Thus, the relief valve 27 will open and bleed pressure from the valve chamber 37 to atmosphere through the bleed port 61 whenever there is relative axial movement of the piston 51 and actuator 59 against the resistance of the spring 54 sufficient to trip the valve core 56 and this relative movement is produceable either automatically by outward movement of the piston under the pressure at which the spring is predetermined to yield or manually at any pressure by depressing the actuator through its handle 62. For enabling the valve assembly 25 to be applied and removed as a unit, the actuator handle 62 and cap 55 are of a diameter to pass through the cross bore 23 and either of these operations is facilitated by the guiding action of the corners 63 formed on the cap.

The improved testing system 1 also includes a master gauge 64 of suitable pressure range, which conveniently is mounted on the testing gun 2 in a fitting 65 threaded into a socket 66 in the top of the body 3. At its base the socket 66 is connected by a duct or passage 67 through the casing 24 to the low pressure annular channel 33 and the master gauge 64 preferably is releasably locked in the fitting 65 by a locking key 68 so as to be swivellable to face in any direction convenient for the operator during a particular testing.

In testing a single pressure gauge or pressure sensing member, the testing gun 2 can be connected by the flexible oulet pipe or tube 22 directly to that gauge. However, the improved system is a readily adaptable to test at one time a plurality of gauges of the same pressure range and, as exemplary of such applications, it is shown in FIG. 1 in a hook-up for simultaneously testing both sides or legs of a pair of duplex pressure gauges 69. In this hook-up the end of the outlet pipe 22 removed from the gun 2 is connected by a quick disconnect coupling 21 to a manifold 70 having on its outlet side four flexible leads each connected by a quick disconnect coupling on its outer end to one of the pair of fittings 72 on which each of the duplex gauges 69 is mounted. While all of the leads 71 are connected in the exemplary hook-up, since the preferred quick disconnect couplings 21 automatically cut off when disconnected, one or more can be disconnected without interfering with testing through the remainder if testing of less than all is desired.

Whether the hook-up is to include one or a plurality of gauges, the testing is greatly facilitated if each gauge is mounted in the improved fitting 72 of the system of the present invention. The improved fitting has a body 73 through which extends from front to back an aperture or opening 74 threaded over its opposite end portions for normally threadedly receiving at the front a plug 75 and for closing at the back by a preferably hollow and inwardly opening threaded cap 76. Between its end portions, the aperture 74 is smooth-walled and divided axially into a cylindrical valve chamber or rearward portion 77 and a concentric cylindrical intermediate bore, passage or forward protion 78 opening onto the front of the body through a testing or plug port 79 formed by the aperture's threaded front end portion, the bore conveniently being of less diameter than the valve chamber to provide at the front end thereof an instanding annular shoulder or stop 80.

In the fitting 72 and opening onto or communicating with the aperture 74 at axially spaced points or positions are a pair of relatively staggered, preferably radial ports or ducts, one an outlet port 81 and the other an inlet port 82 opening respectively onto the intermediate bore 78 and valve chamber 77 preferably adjacent the inner or confronting ends thereof. When the fitting 72 is mounted between and physically connects the gauge or other pressure responsive member 69 and the related pressure line 83, the outlet port 81 leads or is connected to the former and the inlet port 82 to the latter and if, as in the illustrated embodiment, the fitting is connectable at the top to the gauge and at the bottom to the line, the ports conveniently are diametrically opposed and vertically disposed. The physical connection between the fitting and the pressure line 83 may be made in any suitable manner, as by providing a threaded socket 84 in the bottom of the body 73. However, for quick disconnection of the gauge if testing indicates replacement to be needed, as well as to enable the gauge to be swivelled to face in any desired direction, there is provided in the top of the body an upwardly opening, preferably inwardly instepped cylindrical socket 85 in which is swivelly seated or received a correspondingly configured neck or lower part of a swivel nut or coupling base 87. Socketed or otherwise formed above the body 73 for threaded or other relatively permanent connection to the gauge 69, the swivel nut 87 is suitably sealed against leakage to the body 73, as by grooving the lower part of the neck 86 thereof to receive or carry an O-ring 88.

For locking the nut in place while permitting it to swivel relative to the body, the upper part of the neck also is peripherally grooved, in its case for receiving the straddling or embracing, laterally spaced instanding legs 89 of a generally U-shaped locking key 90 insertable from the front into suitable holes or openings 91 and an upstanding boss 92 on the body 73 about the socket 85. Outwardly of the body 73, the locking key 90 has a downstanding loop or looped handle 93 connecting the legs and surrounding or embracing a forwardly projecting or front boss 94 on the body about the testing port 79. To ensure that the loop 93 will always occupy this downstanding position when the locking key 90 is in place, one of the legs 89 and its hole 91 are relatively enlarged or otherwise differently formed from the others so that that leg will only fit into the one hole.

The outlet port 81 to the gauge 69 is intended normally to be connected to the inlet port 82 through the aperture 74 but to be disconnected therefrom during testing. This function preferably is performed by a double-headed, preferably axially bored or hollow shuttle 95 slidable or reciprocable in the valve chamber 77 between the inner end of the cap and the instanding shoulder 80 and conveniently having as its heads a pair of axially spaced O-rings 96, which in the outer position of the shuttle against the cap are positioned outwardly of and in its inner position against the shoulder 80 straddle or embrace the opening of the inlet port onto the valve chamber. A spring 97 in the cap and acting therebetween and the outer or confronting end of the shuttle 95, is adapted yieldably to hold the shuttle in its inner, outlet port closing position against the shoulder 80, in the absence of an overriding, port-closing force on the shuttle's inner end.

To make use of the shuttle 95 and its spring 97 for automatically opening and closing the inlet port 82, respectively as the plug 75 is unthreaded or removed from and threaded or inserted into the testing port 79, the plug 75 has a stem 98 of such length as, when fully seated, to project through the intermediate bore 78 and into the valve chamber 77 sufficiently to engage or bear against the inner end of and force the shuttle to its outer or inlet port-opening position. The tip or inner end portion 99 of the stem 98, at that time spanning or straddling the inner ends of the ports 81 and 82, is of less diameter or cross-section than both the bore 78 and chamber 77 so that the ports can communicate therepast or therearound. Outwardly of the tip 99 and the outlet port 81, the stem preferably is enlarged for a sliding fit with the bore 78 and, for sealing against leakage past the plug 75, conveniently peripherally seats an O-ring or like sealing gasket 100 rubbing against the side of the bore. Rather than depend on the shuttle for limiting inward movement of the plug, the stem 98 outwardly beyond the bore 78 is further enlarged for engagement with an outwardly facing annular shoulder 101 in the aperture 74 at and radially outstanding from the bore's outer end. For applying and removing it, the plug 75 has on its outer end beyond both the body 73 and the loop 93 of the locking key 90, a handle 102, which conveniently may be a knurled knob of sufficient relative diameter not to be able to pass through the loop and should in any case radially or laterally overlap at least part of the loop and have such proximity to the front boss 94 as to be engageable with and prevent removal of the key and unlocking of the swivel nut 87 when the plug is in place.

Normally closing the testing port 79, the plug 75 is removed when the gauge or other pressure sensing member attached to the fitting 72 is to be tested, and replaced for such testing by a testing bayonet or probe 103, which, save for an axial bore 104 through its stem 105, an outward extension 106 of the stem beyond its handle 107 configured to take or receive a quick disconnect coupling 21 on the outer end of one of the leads 71 and the lack of a tip projecting inwardly beyond the outlet port 81, preferably is identical in construction with the plug. As the testing bayonet 103 when fully seated, terminates short of the outlet port 81, its application and removal will not disturb the shuttle 95 from its position closing the inlet port 82. Conversely, the inwardly longer plug 75 will disturb the position of the shuttle and with the spring 97 will automatically move the shuttle between positions to close and open the inlet port 82 respectively as the plug is removed and applied. In process the preferred shuttle, with fluid pressure balanced on its ends due to its axial boring, will be free of any restraint from such pressure.

While the improved testing system is designed to be used as a whole, its testing gun can readily be adapted for testing a pressure sensing member having a conventional fitting and, conversely, the improved fitting 72 can be adapted to receive the probe of a conventional testing system. In the conventional fitting 108 shown in FIG. 12 there is no valve and the testing port 109 normally is closed by the plug 110 shown in FIG. 13. When a testing operation is to be conducted with the conventional fitting, the plug 110 is removed after first bleeding pressure from the line leading to the inlet port 111, whereafter the testing port 109 is closed by a testing probe 112, which, as indicated in FIG. 11, is similar to the adapter probe 113 of FIG. 12, for adapting a conventional fitting for use in the improved system, but differs therefrom in having a check valve 114 normally blocking outflow therefrom and being devoid of the outward stem extension 115 of the adapter probe for taking a quick disconnect coupling 21 on a lead 71 of the improved system, instead being permanently connected to the lead. The converse adapter 116 of FIG. 11 for adapting a conventional probe to the improved fitting, is identical back to its handle 117 with the testing bayonet 103 of the improved system but differs therefrom in having fixed to and extending outwardly from the handle a casing 118 having an outwardly opening socket 119 into which the conventional tester probe 112 is threaded and an offset passage 120 connecting the socket to the axial bore 121 through the stem 122, permitting fluid to flow from the conventional probe to the gauge being tested when the stem is inserted in the improved fitting 72 sufficiently to trip the check valve 114 against the inner end of the socket.

In testing a gauge or other pressure sensing member with the improved system, the plug 75 is first removed from the fitting 72, in process automatically shutting off the inlet port 82 from the testing port 79, the testing bayonet is then inserted in the port and thereafter connected by a quick disconnect coupling 21 to one of the leads 71. At this juncture the testing gun 2 ordinarily will be unloaded or discharged of pressure except in the reservoir 5 and then only if the cartridge 6 in the reservoir has previously been pierced by the pin 9. Once the reservoir is charged with gas at high pressure, around 900 p.s.i. with a $CO_2$ cartridge when first pierced, the gun will be prepared for testing, usually by first turnig or placing the fine adjustment piston 14 in a mid-position or substantially midway of the chamber 12 in the barrel 10 and then backing off the control valve 26 until the pressure passed through the seat 39 to the valve chamber 37 and thence to the inner end of the chamber 10, according to the master gauge 64, is within the range over which the particular gauge 69 undergoing test is to be checked, e.g. the usual range of from 120 to 150 p.s.i. for main reservoir pressure on a diesel locomotive. At that point the control valve 26 will be either closed or cracked only sufficiently to compensate for leakage in the system and the fine adjustment piston 14 will be backed off or retracted and advanced as appropriate to test the locomotive gauge over its range against the master gauge. The testing range can be extended or changed if desired in the same gauge or one covering a different range by admitting more pressure by the control valve and dumping or lowering pressure by manual actuation of the pressure relief valve 27.

From the above detailed description, it will be apparent that there has been provided an improved gauge testing system which uses a gas as its testing medium and requires a minimum of effort on the part of a single operator. It should be understood that the described and disclosed embodiment is merely exemplary of the invention and that all modifications are intended to be included that do not depart from the spirit of the invention and the scope of the appended claims.

What I claim is:

1. A testing system for fluid pressure sensing members, comprising means for supplying a fluid under high pressure, means for reducing the pressure of said fluid to a testing pressure in the range of a sensing member to be tested, means for varying said testing pressure within said range, a hand-holdable testing gun containing said supplying, reducing and varying means, master sensing means exposed and sensitive to said varying testing pressure, and means for applying said varying testing pressure to said sensing member for determining the accuracy of said member relative to said master means.

2. A testing system according to claim 1, for gas pressure sensing members, wherein the fluid is a gas.

3. A testing system according to claim 2, wherein the testing gun mounts said master sensing means.

4. A testing system according to claim 3, wherein the supplying means includes a cartridge of pressurized gas, a reservoir in said gun for receiving said cartridge, and means for releasing said gas within said reservoir.

5. A testing system according to claim 4, wherein the pressure reducing means is a valve assembly including a control valve.

6. A testing system according to claim 5, wherein the varying means includes a chamber open to testing pressure from the control valve, and a piston shiftable in said chamber for varying the free volume thereof, and the master sensing means is a pressure gauge.

7. A testing system according to claim 5, wherein the gun has a body, and the valve assembly includes pressure relief valve means and is mounted as a unit in a bore in said body.

8. A testing system according to claim 7, wherein the control valve includes a valve chamber communicable with the supplying means, and means for controlling the pressure admitted to said chamber from the supplying means.

9. A testing system according to claim 8, wherein the controlling means includes a valve member axially shiftable for varying the volume of the valve chamber, pin means movable with and extending inwardly from said valve member through and beyond the valve chamber for choking flow thereto from the supplying means, and washer means carried by said pin means in the valve chamber for controlling admission to and flow through the chamber of said choked flow.

10. A testing system according to claim 8, wherein the pressure relief valve means is a combined automatically and manually actuatable valve.

11. A testing system according to claim 9, wherein the varying means includes a chamber open to testing pressure from the control valve and a piston shiftable in said chamber for varying the free volume thereof.

12. A testing system according to claim 1, wherein the applying means includes a fitting, an aperture in said fitting and having a testing port in an end thereof, outlet and inlet ports in said fitting opening at axially spaced positions onto said aperture, a plug normally closing said testing port, and testing means insertable in said testing port on removal of said plug for shutting off said inlet port and passing said varying testing pressure to the sensing member.

13. A testing system according to claim 12, including a shuttle in said aperture and shiftable automatically therein in response to application and removal of the plug respectively for opening and closing the inlet port.

14. A testing system according to claim 13, wherein the shuttle is spring-urged toward inlet port-closing position.

15. A testing system according to claim 12, including locking means for locking the sensing member thereto, and means on the plug and engageable with said locking means for preventing movement of said locking means to a sensing member unlocking position except on removal of the plug.

16. A testing system according to claim 15, wherein the locking means is a locking key insertable into the fitting for swivelly locking the sensing member thereto.

17. A testing system according to claim 16, wherein the key is a generally U-shaped member having spaced legs insertable in said fitting and a loop connecting said legs, and the plug has a handle normally disposed outwardly of and radially overlapping said loop.

18. A testing system according to claim 17, wherein the loop in the locking position of the key encircles the testing port of the fitting, and the legs of the key and apertures therefor in the fitting are so relatively formed as to prevent insertion of said legs except with the loop in testing port encircling position.

References Cited

UNITED STATES PATENTS

| | | | |
|---|---|---|---|
| 2,958,219 | 11/1960 | McIntyre et al. | 73—4 |
| 3,049,148 | 8/1962 | Richardson | 73—4X |
| 3,164,979 | 1/1965 | Siegel | 73—4 |
| 3,207,143 | 9/1965 | Kline et al. | 124—11 |
| 3,383,903 | 5/1968 | Webb | 73—4 |

LOUIS R. PRINCE, Primary Examiner

H. C. POST III, Assistant Examiner

U.S. Cl. X.R.

73—420